Nov. 23, 1965    A. M. A. FERTÉ    3,219,124
FARMING MACHINE DESIGNED MORE PARTICULARLY FOR
THINNING-OUT BEETROOTS OR OTHER PLANTS
Filed Dec. 27, 1963    5 Sheets-Sheet 5

Inventor,
Andre M. A. Ferté

By Watson, Cole, Grindle & Watson,
Attorneys

United States Patent Office 3,219,124
Patented Nov. 23, 1965

1

3,219,124
FARMING MACHINE DESIGNED MORE PARTICU-
LARLY FOR THINNING-OUT BEETROOTS OR
OTHER PLANTS
André Marie Auguste Ferté, Terny-par-Margival, Aisne,
France, assignor to Georg Christof, Gugenhan, Rhine-
land, Germany
Filed Dec. 27, 1963, Ser. No. 333,822
Claims priority, application France, Aug. 30, 1963,
946,184
16 Claims. (Cl. 172—38)

This invention relates to a farming machine adapted to be coupled to a tractor and intended more specifically for performing thinning-out work on beetroot or other plants. As is well known, the thinning-out operation is carried out when plants sown in rows grow packed more or less dense- ly together. The operation consists in destroying certain of the plants in order to permit normal growth of the sub- sisting ones.

Modern thinning-out machine utilize implements which are brought automatically into the operative phase (plant elimination) or the inoperative retraction phase (plant preservation). Such implement control can be exercised as a function of time, or preferably as a function of for- ward travel of the tractor, in which case it ensures very uniform work notwithstanding possible variations in the speed of the tractor. It has already been proposed to pro- vide such automatic control of the implements through the agency of an electric or electronic device comprising a feeler or other detector of the presence of a plant that delivers a triggering signal for a thinning-out cycle over a given distance. A machine of this type is described in the specification of, and in the drawings accompanying, the U.S. Patent application Serial No. 333,823, filed De- cember 7, 1963.

The present invention relates to alternative forms of embodiment of, and improvements to, such a machine.

In accordance with this invention, the farming imple- ments are imparted with an oscillating motion in a trans- verse plane relative to the direction of travel of the tractor, said oscillating motion being adjustable to enable the im- plements to pass over the ground along the longitudinal vertical plane of a row of plants during the operative phases of the work, or to keep said implements spaced laterally from said longitudinal vertical plane during the inoperative retraction phases of the work. Such adjust- ment can be applied to the oscillation amplitude, a large amplitude corresponding to the operative phase of the im- plements and a small amplitude to their inoperative phase. In an alternative form of embodiment, the adjustment can operate to so limit the oscillation movement that, in one case, the angular range of movement of the implement contain said longitudinal vertical plane and, in the other case, it be entirely outside that plane.

In the preferred embodiment of this invention, the im- plements are grouped together in pairs with a certain an- gular spacing therebetween in the transverse plane and, in the operative phase of the work, act alternately at each half-oscillation of the pair of associated implements.

In accordance with a specific technical feature of the invention, the implements are mounted on longitudinal transmission shafts which are driven by a continuously ro- tating driving shaft through the medium of a convenient

2 coupling adapted to convert said continuous rotation into an alternating angular motion of the transmission shafts.

When the implements are imported with a variable os- cillation amplitude, the present invention provides said transmission shafts in the form of torsion bars having one extremity connected to the driving shaft and implements mounted on their other extremity, means being provided to limit or restrain the oscillating motion of said torsion bars at the latter-mentioned extremities thereof.

When said implements are imparted with variably lo- cated limits of oscillation but without change of amplitude, the longitudinal transmission shafts may be non-elastic, said adjustment then operating on the angular offset or position of origin of the implements.

In either case, the desired control can be obtained by means of an electromagnet, an electromagnetic brake, or other intermittently operating electrical device slaved to suitable means for adjusting the respective energizing and de-energizing times during the cycle.

The description which follows with reference to the ac- companying non-limitative examplary drawing will give a clear understanding of how the invention can be carried into effect.

Referring to the drawings filed herewith:

FIGURE 1 shows schematically in plan view and hori- zontal section a portion of a machine according to this invention.

FIGURE 1a is a section taken through the line Ia—Ia of FIGURE 1.

FIGURE 2 is an elevation view as seen in the direc- tion of arrow $F_1$ of FIGURE 1.

FIGURES 3 and 4 are respectively schematic side ele- vation and end views of two embodiments of an imple- ment controlling device according to this invention.

FIGURE 5 shows schematically in plan view an al- ternative form of embodiment.

FIGURES 7, 8 and 9 are diagrams relating to an al- ternative form of embodiment.

FIGURES 10 and 11 illustrate a device for controlling the implements.

FIGURE 12 shows in fragmental horizontal section a further alternative embodiment of the invention.

FIGURE 13 is a side elevation view of the latter-men- tioned embodiment, as seen in the direction of the arrow $F_2$ of FIGURE 12.

FIGURE 14 shows in side elevation still another al- ternative embodiment.

FIGURE 15 is a sketch illustrating the electric con- trol circuitry.

The machine frame is omitted from the drawings, since it is of a type in common use, usually consisting of a channel section provided with the necessary fittings for coupling it to the tractor and for raising it through the medium of a suitable linkage system. On said channel section are mounted the implement supporting casings with adjustable spacing therebetween to enable them to be adapted to the spacing between the lines of plants to be worked. The drive motion to the implements is provided by a driving shaft co-extensive with the chan- nel section.

In FIGURE 1, reference numeral 1 designates said transverse driving shaft, numeral 2 the implement supporting casing through which it extends freely and which is adjustable in parallelism with said shaft. Said casing is secured to the frame at 3—3 through the medium of a toggle 4 which imparts to the implement-support a degree of angular freedom in the vertical plane in order to allow for irregularities of the terrain. Such irregularities are followed, in the manner well known per se, by a yoke 5 (see FIGURE 2) terminating in shoes 6 positioned to either side of the row of plants and riding over the ground. Said yoke supports, through a pivotal connection 7, a feeler 8 which is adjustable vertically by means of a milled screw 9.

The implements operate along the axis of the yoke upon the aligned plants. Said implements are knives bent at 90° relative to their stems, and are double-edged and slightly cambered between the two edges.

The continuous rotation of transverse driving shaft 1 is transformed by any convenient coupling 10 into an oscillating or alternating rotary motion applied to a longitudinal transmission shaft 11 consisting of a torsion bar supported in bearings 12—12 in a tubular extension 2a of the casing 2. Said casing carries an electromagnet 13 and an abutment support 14–21 whose function will be disclosed hereinafter.

In the example shown in the drawing, the coupling device 10 which converts the continuous rotation of shaft 1 into an oscillating motion of torsion bar 11 comprises a cylindrical piece 70 having therein an oblique hole 71 by which it is threaded over shaft 1 and keyed thereto. A cylindrical bush 72 is loosely mounted over piece 70 with an interposed anti-friction bearing 73. Said bush bears two diametrically opposed spherical nipples 74 which are held captive in the prongs 75 of the fork-ended torsion bar 11. It will be manifest that, on rotation of shaft 1, the common geometrical axis of piece 70 and bush 72 will describe a cone about the geometrical axis of shaft 1. The nipples 74, which remain contained in the plane of FIGURE 1a due to the fact that bush 72 is loosely mounted on piece 70, describe in that plane an oscillating motion which is transmitted to the torsion bar 11 by the fork 75. It will be obvious that the amplitude of the oscillating motion of bar 11 will depend on the inclination of the geometrical axis of piece 70 relative to the geometrical axis of shaft 1.

The free end (right-hand side on FIGURE 1) of torsion bar 11 has secured thereto the implement-support 15 (see FIGURE 3) which consists of a channel section bent into hairpin shape and onto each arm of which the implement proper is secured through the medium of its stem and two springs. The implement-support 15 is mounted on the extremity of torsion bar 11 by way of the inner sleeve 16 of a silent-block device whose outer sleeve 17 bears the implement-support 15, which support may be welded to sleeve 17. Said sleeve 17 is rigid with a piece 18 having thereon a V-shaped latching fork 19 opening outwardly.

Between the prongs of fork 19 is positioned a movable abutment peg 20 supported on an arm 21 pivotally connected at 22 to the aforementioned support 14, which is rigid with the casing 2a. The arm 21 is biased by a spring 21a anchored to a fixed part 21b, which spring tends to raise abutment peg 20 towards the flared portion of fork 19.

Said electromagnet 13 is likewise fixed to casing 2a, and its armature is adapted to pivot an arm 23 whereby to cause the free extremity thereof to come to bear against the arm 21 carrying the abutment 20. Thus, the position of abutment 20 in fork 19 is determined by the mutually countering actions of spring 21a tending to raise it and energized electromagnet 13 tending to lower it. The assembly 20–21–23 can thus occupy either the latched position shown in solid lines, with abutment 20 at the bottom of the V in fork 19, or the operative position shown in broken lines, with abutment 20 near the open end of the V but still contained therein, according as electromagnet 13 is energized or not. The abutment 20 and/or the inner edges of fork 19 can be lined with rubber or with any other convenient shock-absorbing material.

The disposition hereinbefore described works in the following manner:

When abutment 20 is in the raised position (shown in broken lines), fork 19 can have imparted to it by torsion bar 11 a relatively large angular oscillation which is determined by the width of the V opening. Conversely, when abutment 20 is in the lower position (shown in solid lines), fork 19 will be capable of only limited angular movement by reason of the narrowness of the bottom of the V in fork 19.

It will thus be manifest that, in the former case, the implement-support 15 will have a wide oscillation amplitude, with torsion bar 11 transmitting the full alternating angular motion imparted to its opposite end by driving shaft 1, while in the latter case implement-support 15 will be restricted to a smaller oscillation amplitude, with torsion bar 11 then sustaining alternating elastic torsions.

The full oscillation amplitude is such that, by virtue of the angular aperture of the implement-support arms 15, each implement alternately passes through the vertical position and destroys the plant in its path. However, when the oscillation amplitdue is restricted or nil, arms 15 remain astride the line of plants without being able to reach them, thus sparing the plant located in the oscillation plane of the implements, which implements are nevertheless able to perform a second dressing of the soil on either side of the line of plants without prejudice to the latter. In short, the implements are imparted with an oscillating motion of variable amplitude.

The effect of the silent-block 17 and the torsion bar 11 is to protect the implements against knocks received from objects encountered along the working path, to damp out each oscillation peak and to impart a whip-like effect to the implement when it strikes the ground.

Figure 4:
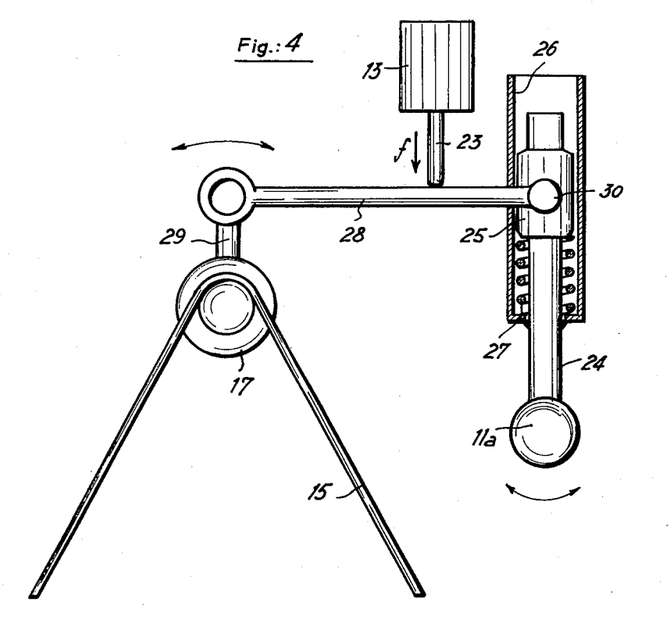

FIGURE 4 shows an alternative embodiment of the control means of the oscillation amplitude of the implement-support 15 through the agency of electromagnet 13.

In this specific example, the oscillating shaft 11a is distinct from the implement-support 15, transmission taking place through an osciallating rod 24 which is rigid with the end of oscillating shaft 11a and along which a slide 25 is displaceable in a channel section 26 and is spring-loaded by a compression spring 27. Slide 25 is connected through a link 28 to a crank 29 which is connected to implement-support 15 through silent-block 17.

When electromagnet 13 is energized, its rod 23 moves in the direction of arrow f and displaces link 28, thereby moving slide 25 towards oscillating shaft 11a against countering spring 27. Manifestly, this will cause articulation point 30 of link 28 to describe an arc of small radius, as a result of which the oscillation amplitude of the crank 29 actuating implement-support 15 will be small. Conversely, when electromagnet 13 is de-energized, slide 25 is thrust upwardly by spring 27 and the articulation point 30 moves away from oscillating shaft 11a. Articulation point 30 will then describe an arc of large radius, as a result of which implement-support 15 will have a large oscillation amplitude.

It will thus be clearly understood that the system has two different operating positions: firstly, an operative position of the implements wherein electromagnet 13 is de-energized and slide 25 raised and, secondly, an inoperative retracted position of the implements wherein electromagnet 13 is energized and slide 25 lowered. The system is preferably so devised that the raised and lowered positions of slide 25 be symmetrical with reference to the midway position of link 28, in order that the oscillating motion of the implement-support occur about a common midway position.

Figure 5:
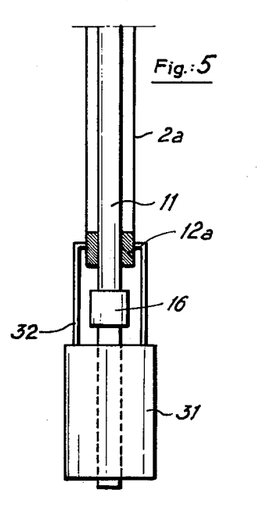

Reference is next had to FIGURE 5, which shows another alternative embodiment of the amplitude control means for the implement-support and in which reference numeral 16 designates the inner sleeve of the silent-block fixed to the torsion bar 11, as in the preceding example of FIGURE 3.

In this example, the electromagnet used in the previous forms of embodiment is replaced by an electromagnetic brake 31 which is mounted on an outrigger comprising arms 32 connected to casing 2a and which is positioned at the end of the torsion bar 11, which bar projects from casing 2a through a plain bearing 12a made of a convenient antifriction metal such as the metal known by the name of "Du Glacier." The electromagnetic brake comprises a member 33 (see FIGURE 6) generally shaped as a 2- or 4-leaf clover adapted to rotate between stationary pole-pieces 34, said member 33 being angularly rigid with torsion bar 11.

Figure 6:
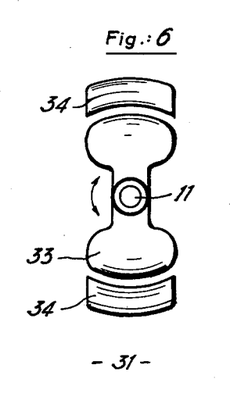
FIGURE 6 is a detail view of the form of embodiment of FIGURE 5.

It will be manifest that when electromagnetic brake 31 is de-energized, the member 33 will be free to rotate, thereby enabling sleeve 16 to oscillate at full amplitude; conversely, when said electromagnetic brake is energized, the pole-pieces 34 generate an electromagnetic field before them which opposes free rotation of the member 33 and restricts its movement to narrow limits only, the result of which is to restrain the extremity of torsion bar 11, and to cause sleeve 16, which is positioned in proximity thereto, to oscillate with a small amplitude only.

The electromagnetic brake referred to may be replaced by a printed-circuit device offering significant advantage from the point of view of weight, inertia, and current consumption.

The control means of the implements need not necessarily involve a variation of their oscillation amplitude. For instance, the desired result could be obtained, whilst at the same time retaining a constant amplitude, by the mere angular shifting of the entire oscillation range of the implements. An embodiment that operates on this principle is shown in FIGURES 7 and 8.

In this form of construction, the oscillating shaft is rigid and drives a plate 35 to which are pivotally connected at 36—36 two levers 37—37 which receive the implement-supports 15a—15a (shown here as being separate) and which are provided with mutually offset and facing nose-pieces 38—38, as shown in FIGURE 8. Plate 35 comprises a ball 39 which is urged by a spring 40 against the lower ends of nose-pieces 38—38 and thereby maintains levers 37—37 applied against an appropriately shaped abutment 41 integral with plate 35 (which abutment is represented for greater clarity by the shaded portion of FIGURE 7). The strength of spring 40 is adjustable by means of a telescopic screw 42.

The upper faces of nose-pieces 38—38 of levers 37—37 are adapted to receive the pressure contact of rollers 43—43 supported on arms 44—44 which are pivotally mounted at 45—45 and are operable respectively by electromagnets 46—46.

When the latter are de-energized, the rollers 43—43 are in the upper position, out of contact with nose-pieces 38—38 of levers 37—37, with the assembly in the position shown in FIGURE 7. If electromagnets 46—46 be now energized, the arms 44—44 will be lowered in the direction of arrows $f_1$ and rollers 43—43 will move into pressure contact against nose-pieces 38—38 and cause levers 37—37 to pivot outwardly in the direction of arrows $f_2$, thus compressing spring 40 and placing the implement-supports 15a—15a in an angularly more offset position.

In the formed case (electromagnets 46—46 de-energized), which corresponds to the operative condition of the implements, the latter may form an angle of 30°, say, as shown by AOB in FIGURE 9, which defines the midway positions of the implements. If the oscillation amplitude of plate 35 is 30° to either side of the midway position, it will be seen that the straight line OA will oscillate between OB and OC as shown by the arrow $a$, while the straight line OB will oscillate between OD and OA as shown by the arrow $b$. With each half-oscillation, each of the straight lines OA and OB will pass through the vertical plane OV containing the line of plants.

In the latter case (electromagnets 46—46 energized), which corresponds to the inoperative retracted condition of the implements, the midway positions of the latter are offset by, say, a further 30° to the left and to the right of the centerplane OV; in other words, the straight lines OA and OB are displaced to OC and OD respectively. It will be seen that over its oscillation range of 60°, OC sweeps the angle $a'$ between OE and OA, while OD sweeps the angle $b'$ of equal value between OB and OF. In no case do the straight lines OC and OD pass through the vertical plane OV, so that the line of plants contained therein is not reached.

It will be noted that the disposition hereinbefore described involves a duplication of the rollers 43, of the arms 44 thereof and of electromagnets 46, whereas a single set would suffice provided that a single roller 43 were provided to coact simultaneously with the two nose-pieces 38—38. However, this duplication fulfills a specific purpose; in view of the fact that, at any given instant, only one implement is in the operative position in the soil while the other is up in the air, it will be seen that the roller 43 associated to the latter implement will have no resistance to overcome other than that offered by spring 40, whereas the second roller 43 associated to the implement in the soil will have to overcome the soil resistance in order to extract its associated implement. Thus, duplicated electromagnets 46 can be of lower unit power, whereas a single electromagnet would have to be more powerful.

It will be of advantage to devise the system so that, in their bottom position, the rollers 43 come in extension of the oscillation axis of plate 35, in order that they not be subjected to oscillations originating from this movement but remain stationary.

The various forms of embodiment of the invention described hereinabove enable cyclic thinning-out operations to be performed, each cycle comprising an inoperative retracted phase for the implements and an operative phase thereof, of which the respective durations will be adjustable and a function of the rate of travel of the tractor.

Figure 10:
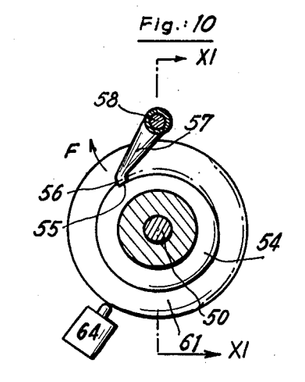
Figures 11, 15:
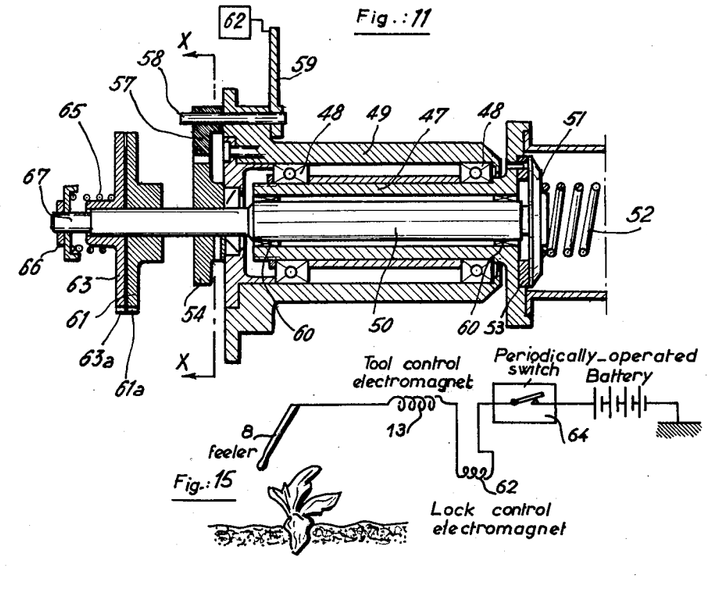

The system shown in FIGURES 10 and 11 is adapted to generate the desired control signals and adjustments. This system is driven, through any convenient speed variator, by one or more wheels of the towed frame which roll without slipping on the ground when the tractor is moving forward and which actuate the implement in a manner similar to that described in the aforementioned patent application Serial No. 333,823.

The drive power from said frame wheel or wheels rotates a hollow shaft 47 which is supported in bearings 48 housed in a casing 49 fixed to the frame of the machine. Within hollow shaft 47 is rotatable, in bearings 60, a coaxial shaft 50 of which one end is rigid with a disc 51 which is urged by a spring 52 against a bush 53 made of "Du Glacier" metal and fitted over hollow shaft 47. The assembly 51, 53 forms a clutch for driving the shaft 50 off shaft 47 while at the same time permitting relative slip there between in the event of shaft 50 being immobilized.

Shaft 50 bears a disc 54 having thereon a peripheral arresting notch 55 into which is engageable the tip 56 of a locking pawl 57 fixed to a pivot 58. To pivot 58 is keyed an arm 59 adapted to be tilted by an electromagnet 62 whereby to disengage the pawl 57 from notch 55, in the direction of arrow F. Onto shaft 50 is likewise fixed a generally circular cam 61 having thereon a recessed arcuate portion 61a extending over 180° for example. A second similar cam 63 is mounted in angularly adjustable fashion on shaft 50 and embodies a similar arcuate portion 63a. This second cam 63 is held applied against the first cam 61 by a spring 65 which is adjustable by means of a nut 66 screwing onto the threaded extremity 67 of shaft 50.

These two associated cams operate a normally-closed microswitch 64 inserted into the energizing circuit of electromagnet 62, in series with the feeler 8 of FIGURE 2. The microswitch 64 is also inserted into the circuit for energizing or supplying the electrical device (electromagnet or electromagnetic brake) for controlling oscillation of the implements, according to the embodiments described precedingly.

When feeler 8 detects the presence of a plant by contact, an earth is provided which closes the energizing circuit of electromagnet 62, thus disengaging pawl 57 from notch 55 and freeing disc 54. Shaft 50 is then driven by shaft 47, through 51–53 which ceases to slip. Shaft 50 can complete a full revolution until the tip 56 of pawl 57 engages once more with notch 55, thus locking shaft 50 and causing clutch 51–53 to slip anew. Obviously, locking will not take place if, at that particular instant, feeler 8 should detect another plant, since microswitch 64 is closed when cam-bearing shaft 50 is in the locked angular position.

In other words, as shown on FIGURE 15, the electromagnet 13 is energized—and therefore the tools are rendered inoperative—as soon as the periodically-operated switch 64 is closed, provided that simultaneously the feeler 8 is in contact with a plant; on the other hand, the electromagnet 13 remains de-energized—and therefore the tools are in operative position—so long as the periodically-operated switch 64 remains open and also if, when closed, the feeler 8 has detected no plant.

It will be manifest that by shifting cam 63 relative to cam 61, the angle of operation of the microswitch 64 will be modified, and consequently also the relative time of its closure and opening. In other words, the duration of the pulse is a function of the relative angular setting of the two cams. During this time, the device controlling oscillation of the implements remains energized and is de-energized when the cams reach the end of their travel.

During the rotation time of the cams over and above their positively operative rotation phase, microswitch 64 opens, as a result of which detection by the feeler 8 of a fresh plant remains ineffective since the circuit is closed only provided that the dual requirements of microswitch 64 being closed and feeler 8 being in contact with a plant are satisfied simultaneously.

The rotation time of the cams corresponds to the distance separating two consecutive plants to be spared on the ground. It will be appreciated that the number of plants spared along a given distance depends only on the time taken for the cam-bearing shaft 50 to complete a full revolution, which time in turn depends, as already explained, only on the rate of travel of the tractor. Thus, operation of the farming implements is a function solely of the distance covered by the tractor.

In the form of embodiment shown in FIGURES 12 and 13, a rigid shaft 11a supported in convenient bearings of the machine frame replaces the torsion bar 11 described with reference to FIGURES 1, 3, 4 and 5. That extremity 11b of said shaft which is remote from the coupling device 10 of FIGURE 1 therefore describes the full oscillating motion imparted to it by said device. A plate 76 keyed to shaft 11a carries an associated counter-plate 77 slidably mounted on studs 78 rigid with plate 76 and is thrust towards plate 76 by springs 79 threaded over said studs. Between plate 76 and counter-plate 77 is a disc 80 rigid with the part 81 onto which are fixed the implement-supports 15, through the medium of rubber-embodying attachments 82, after the fashion of "silent-blocks." The springs 79 cause the disc 80 to be tightly clamped between plate 76 and counter-plate 77, thus tending to constrain the implement support 81 to follow the oscillating motion of plate 76. However, this motion is limited by a fork 83 similar to the fork 19 of FIGURE 3, which fulfills an identical function, the prongs of said fork forming a V which cooperates with the abutment peg 20. Said peg is supported by the arm 21 which pivots about a fixed shaft 22 and is urged by the tension spring 21a anchored to a fixed part 21b. A pivoting arm 23 is controlled by an electromagnet 13, the entire assembly operating as hereinbefore described with reference to FIGURE 3. Such operation obviously presupposes that disc 80 slips relative to plate 76 and counter-plate 77 once the peg 20 is fully home in the fork 83 after the electromagnet has been energized. It is preferable to provide a suitable lining 84 between disc 80, plate 76, and counter-plate 77, which lining may be made of metal or an anti-friction substance, an example being the substance known under the name of "Du Glacier." The implement-supportiong piece 81 can be mounted on antifriction bearings or on a similar lining 85 and be supported on the extremity 11b of oscillating shaft 11a.

Rubber stops 86 are preferabely provided on a fixed part of the machine, on either side of fork 83. These stops limit the maximum oscillation of said fork and the implement-supports and automatically bring the oscillation of the implement-support into phase with that of shaft 11 when the abutment peg 20 moves from the oscillation-arresting position shown in dot-dash lines in FIGURE 11 to the maximum oscillation position shown in solid lines.

In the form of embodiment shown in FIGURE 14, the implement-supports 15, which oscillate in traverse planes which are very slightly offset relative to each other, are loosely mounted on the extremity 11b of an oscillating shaft 11a similar to that described with reference to FIGURES 12 and 13. A plate 76 mounted eccentrically on the end 11b of the oscillating shaft supports an eccentric triangular abutment 91. A spring 92 whose extremities are fixed to the bars 15 of the implement-supports tends to maintain the angle between said bars constant by pressing the portions 90 against said abutment through the medium of rubber damping pads 93. Each of the implement-supports is extended beyond pivot 11b by a cranked portion 94 and 95 respectively. These extensions 94 and 95 bear on their extremities teeth 96 and 97, respectively, which are bounded externally by a circular arc 96a and 97a whose center lies on the geometrical axis of shaft 11a–11b. The teeth 96, 97 cooperate respectively with cams 98, 99 associated respectively to the armatures of electromagnets 100 and 101. Each of cams 98, 99 can occupy either of two positions, to wit:

a position shown in solid lines on FIGURE 14, corresponding to non-energization of the electromagnets, and an angular position slightly offset relative to the above-mentioned position and shown in broken lines on the left-hand parts of FIGURE 14, which position corresponds to energization of the electromagnets.

In the former position, the cams permit free oscillation of the teeth 96, 97, which follow the motion of the implements. Conversely, in the latter position for which the electromagnets are energized by a pulse of current received from the plant detector, the two cams 98 and 99 tend to assume the position shown in broken lines on the left of FIGURE 14. They assume this position as soon as the corresponding implement reaches the end of its oscillation (shown in broken lines in the case of the right-hand implement on FIGURE 14). The cams then prevent the implements from returning, which implements are locked in mutually widely spaced positions (against the countering pull of springs 92) and which, since they no longer oscillate, spare the plants which run past them during that time. It will of course be manifest that, during this time, the oscillations of shaft 11a–11b are absorbed through the portions 90 slipping relative to oscillating plate 76.

As soon as the electromagnets are deenergized, the cams 98, 99 rotate back into the position shown in solid lines. The implements are then released and resume their oscillating motion for working the soil, with the spring 92 restoring them against abutment 91, into their relative positions shown in solid lines.

Each of the implement-support portions 94 and 95 can be provided with a hard metal heel such as 102, 103 in order to prevent wear by contact with cams 98, 99.

What is claimed is:

1. A farming machine designed for performing thinning-out operations on beetroot and the like, comprising a support adapted to be coupled to a tractor for displacement over the soil, a shaft carried by said support and extending in a generally fore-and-aft direction, drive means at the fore end of said shaft for imparting thereto a reciprocating angular movement, controllable coupling means at the aft end of said shaft having two operative states, control means for alternately setting said coupling means in one and the other of said operative states, and a transversely oscillatable implement fitted on said coupling means and adapted to perform a thinning-out action every time said implement passes through a vertical longitudinal plane, the mutual arrangement of said coupling means and said implement being such that, when said control means sets said coupling means in one of said operative states thereof, said implement oscillates over a transverse angular range which includes said vertical longitudinal plane and, when said control means sets said coupling means in the other of said operative states thereof, said implement oscillates over a transverse angular range which excludes said vertical longitudinal plane.

2. A machine as claimed in claim 1, wherein the coupling control means comprise an electrically operating device having two operative conditions related respectively to energization and de-energization of said device and corresponding respectively to the operative state of the coupling means wherein the oscillation range of the implement excludes the vertical longitudinal plane and to the operative state of said coupling means wherein the oscillation range of said implement includes said plane.

3. A machine as claimed in claim 2, wherein the electrically operating device comprises an energizing circuit having in series an earth connection, a source of electric current, a periodically-operated switch lockable in closed position and having a work cycle which consists in an opening phase and a closure phase of predetermined relative duration, a coil adapted to unlock said switch upon passage of current through said coil, and a plant feeler positioned above the soil.

4. A machine as claimed in claim 1, comprising a further transversely oscillatable implement similarly fitted on the coupling means and similarly adapted to perform a thinning-out action every time it passes through the vertical longitudinal plane, the two implements being angularly spaced from one another in the transverse plane of oscillation thereof and having a mean position wherein they are substantially symmetrical about said vertical longitudinal plane.

5. A machine as claimed in claim 4, wherein the controllable implement coupling means having two operative states are adapted, in one of said states thereof, to impart oscillations to the implements of such wide amplitude that each implement oscillates across the vertical longitudinal plane, and, in the other of said states thereof, to impart oscillations to said implements of such narrow amplitude that each implement oscillates at a distance from said plane without crossing the same.

6. A machine as claimed in claim 5, wherein the drive means at the fore end of the shaft is adapted to impart thereto a reciprocating movement of substantially constant angular amplitude, and the controllable implement coupling means at the aft end thereof is adapted, in one operative state, to allow free oscillation of the implements of substantially the same angular amplitude and, in the other operative state, to restrain said oscillation to a substantially smaller angular amplitude.

7. A machine as claimed in claim 6, wherein the controllable implement coupling means comprises a member secured to the implements and having an outwardly-opening V-shaped recess formed therein, a movable stop extending into said recess and engaging said member, said stop being adjustable to an inner position in which it is located close to the bottom of said V-shaped recess and to an outer position in which it is located close to the periphery thereof.

8. A machine as claimed in claim 7, wherein the controllable implement coupling means comprises further a silent block interposed between the aft end of the shaft and the implements.

9. A machine as claimed in claim 7, wherein the coupling control means comprises an electromagnetic device adapted, when energized, to urge the stop to the inner position thereof, and resilient return means for urging said stop to the outer position thereof when said device is de-energized.

10. A machine as claimed in claim 7, wherein the shaft is a rigid bar, and the controllable implement coupling means comprises further a friction plate fast against rotation relatively to said shaft, a friction counterplate fast against rotation but axially slidable relatively to said plate, a fraction disc fast with the recessed member and extending between said plate and said counterplate, said friction disc being mounted for free rotation about said shaft, and resilient means for urging said friction plate and counterplate toward one another thereby engaging therebetween said friction disc.

11. A machine as claimed in claim 10, wherein the controllable implement coupling means comprises further stationary resilient spaced abutments on both sides of the recessed member.

12. A machine as claimed in claim 6, wherein the shaft is a resilient torsion bar and the controllable implement coupling means is adapted to restrain the aft end of said torsion bar.

13. A machine as claimed in claim 12, wherein the controllable implement coupling means comprises an electromagnetic brake having an armature secured to the aft end of the resilient shaft and a stationary field system opposite said armature, and the coupling control means comprises means for energizing and de-energizing said electromagnetic brake.

14. A machine as claimed in claim 6, wherein the controllable implement coupling means comprises a radially extending crank at the aft end of the shaft, a slide movable radially along said crank, a secondary cranked shaft carrying the implements and having its axis substantially parallel to the axis of the former shaft, and linking means between said slide and said secondary cranked shaft, and wherein the coupling control means comprises spring means for urging said slide radially away from said former shaft, and an electromagnetic device adapted, when energized, to urge said slide radially toward said former shaft.

15. A machine as claimed in claim 4, wherein the controllable implement coupling means having two operative states is adapted to impart oscillations to the implements of such extreme positions that, in one of said states, the extreme positions of each implement are on both sides of the vertical longitudinal plane, and, in the other of said states, the extreme positions of each implement are on a same side of said plane.

16. A machine as claimed in claim 15, wherein the controllable implement coupling means comprises a support plate fast with the aft end of the shaft, implement carriers separately pivotable on said support plate about longitudinal axes, and wherein the coupling control means comprises spring means for urging said implement carriers angularly toward one another, and an electromagnetic device adapted, when energized, to urge said implement carriers angularly away from one another.

References Cited by the Examiner

UNITED STATES PATENTS

| | | | |
|---|---|---|---|
| 370,875 | 10/1887 | Jordan | 172—107 |
| 876,664 | 1/1908 | Smith | 172—62 |
| 2,723,611 | 11/1955 | Holthouse et al. | 172—58 X |
| 2,744,459 | 5/1956 | Craig | 172—58 |
| 3,014,537 | 12/1961 | Thelander et al. | 172—58 |

FOREIGN PATENTS

| | | |
|---|---|---|
| 812,321 | 4/1959 | Great Britain. |
| 861,590 | 2/1961 | Great Britain. |

ABRAHAM G. STONE, *Primary Examiner.*